Oct. 2, 1934.   M. OSNOS   1,975,647
RECTIFIER
Filed Nov. 14, 1930
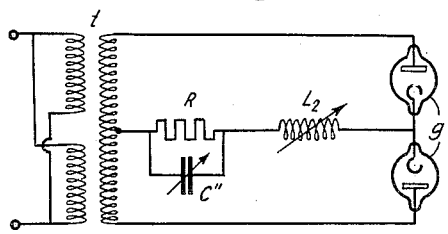
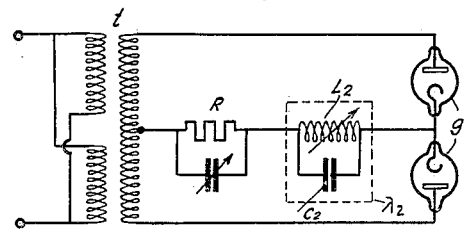
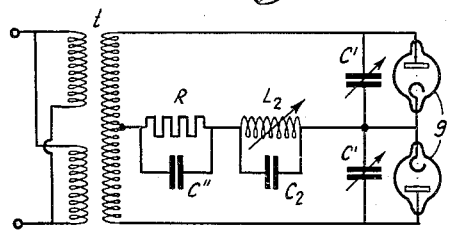
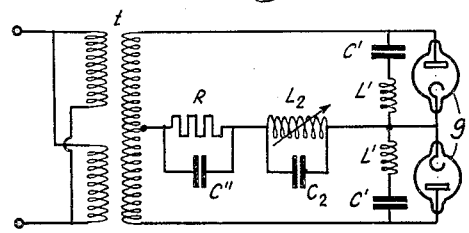
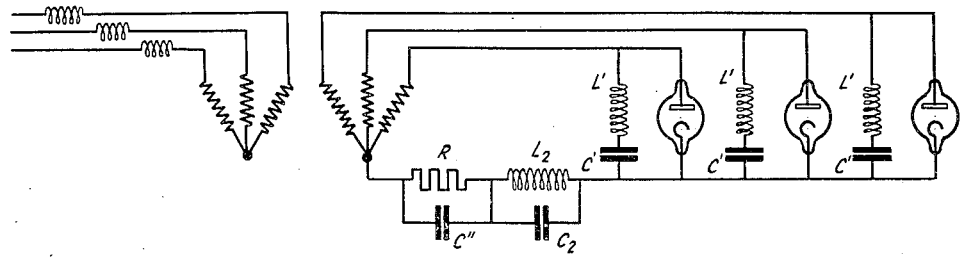
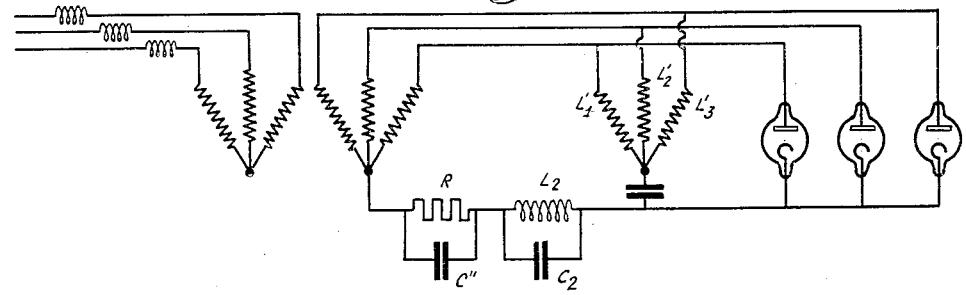
INVENTOR
MENDEL OSNOS
BY
ATTORNEY Patented Oct. 2, 1934

1,975,647

UNITED STATES PATENT OFFICE 1,975,647

RECTIFIER

Mendel Osnos, Berlin, Germany, assignor to Telefunken Gesellschaft für Drahtlose Telegraphie m. b. H., Berlin, Germany, a corporation of Germany Application November 14, 1930, Serial No. 495,587
In Germany November 9, 1929

4 Claims. (Cl. 175—363)

This invention relates to rectifier circuits.

An object of this invention is to improve rectifier circuits as applied to two and three-phase rectifier installations.

Another object of this invention is to improve rectifier circuits by the addition of a stopper or tuned circuit. The invention will be more clearly understood by referring to the accompanying drawing, in which, Fig. 1 shows a diagram of a rectifier circuit;

Fig. 2 shows a diagram of a rectifier circuit having included therewith a tuned or stopper circuit;

Fig. 3 shows a wiring diagram of a rectifier circuit having included therewith suitable impedances;

Fig. 4 shows a diagram of a rectifier circuit having included therewith a circuit similar to Fig. 3 except for the addition of a shunted inductance and capacity circuit;

Fig. 5 shows a diagram of a three-phase rectifier circuit corresponding generally to Fig. 4;

Fig. 6 is another three-phase rectifier circuit which is a further modification of Fig. 5.

In building rectifier equipment it is known from the prior art to provide in parallel to the load or consumer so-called smoothing capacities $C''$ and in series therewith an inductance $L_2$, for the purpose of suppressing undesirable alternating current actions in the load or consumer, as shown in Figure 1 of the drawing comprising a rectifier $g$ consisting of two or more valves fed from a transformer $t$, and a load or consumer $R$ connected in the middle conductor.

Now, this scheme involves the drawback that overtones or higher harmonics accumulate at the valve tending to result in an undesirable rise of potential in the valves.

According to this invention, the said inconvenience is obviated by that in lieu of $L_2$ a stopper circuit is employed which is tuned to that wave or higher harmonic which predominates in the equipment; in other words, in the case of a two-phase installation, to the overtone $\lambda 2$ of double frequency, in the case of a three-phase equipment to $\lambda 3$, in the case of a six-phase installation to overtone $\lambda 6$ (see Figure 2).

A still better action is insured if in addition suitable resistance, most suitably impedances such as choke-coils, capacities, or combinations thereof, are connected in parallel relation to each valve (see Figure 3).

Experiments have shown that by adding such capacities, the alternating current flowing across $R$ is reduced to ¼ or ⅕ of its original size. This is probably due to that these capacities $C'$ substantially absorb these current variations.

Capacities $C'$ offer this further merit that, if properly proportioned, they may at the same time be used for improving the power factor ($\cos \phi$) upon the primary end of the equipment. This is of particularly great advantage in the case of large rectifier installations in which, to avoid large short-circuit current in case of flashovers in a valve, large reactance coils are provided in the alternating current circuit, a fact which ordinarily tends to impair the power factor considerably (about 0.8). By the provision of capacities $C'$ the harmful effect of these reactance coils may be wholly or partly obviated, while yet preserving their useful action; for these capacities exercise a phase-improving effect as long as the valves are in proper operating condition. However, as soon as a flashover occurs in one of the valves, then also the corresponding capacity is short-circuited at the same time, and the choking action of the reactance coils comes into operation.

The arrangement shown in Figure 3 involves one drawback, namely, that in case of a flashover of a valve the corresponding capacity $C'$ may discharge upon the valve and may thereby damage it. In order that also this inconvenience may be avoided, a branch or shunt $L'C'$ tuned to the overtones mostly arising is connected in parallel to each valve instead of a pure capacity (see Figure 4).

If, then, a flashover is produced in one valve, the current is unable to rise since $C'$ is prevented by $L'$ to become fully discharged.

In spite of the fact that $L'$ is added, the shunt $L'C'$ will exercise a phase-improving action in actual operation. Since the shunt is tuned to an overtone it constitutes a capacitive reactance for the fundamental frequency or wave.

Figure 5 illustrates by way of example a scheme for a three-phase installation corresponding to Figure 4. In this case $C'L'$ is tuned to wave $\lambda_2$ and $L_2C_2$ to wave $\lambda_3$.

It is easy to apply the same idea analogously to an equipment comprising more than two phases. For example, in the case of a six-phase plant, six valve systems have to be provided, and each one of the latter has connected in parallel with it a branch or shunt $L'C'$ tuned to $\lambda_2$, while the stopper circuit $L_2C_2$ must then be tuned to wave $\lambda_6$.

If the improvement in the power factor obtained by $C'$ and $L'C'$ is of no practical importance, then the kilovoltampere consumption of all condensers C' and thereby their first cost of production can be considerably reduced by a scheme as shown in Figure 6. As will be seen, all condensers C' shown in Figure 5 have been combined in Figure 6 to form a single capacity so that C' essentially absorbs the oscillatory energy of $\lambda_6$. But the amplitude of $\lambda_6$ is considerably smaller than that of $\lambda_2$, and the same condition therefore holds true of the oscillatory energy. The stopper $C_2L_2$ in this case must again be tuned to $\lambda_3$, while the circuits $L'_1C'$, $L'_2C'$, $L'_3C'$, respectively, should be separately tuned each to wave $\lambda_2$.

The choke-coils either may be out of magnetic relationship or linkage or else be built like a three-phase transformer, in other words, be in magnetic relationship.

Having thus described my invention and the operation thereof, what I claim is:

1. Means for producing unidirectional current from a source of alternating current comprising, a transformer having its primary winding connected to said source, a plurality of rectifier tubes having an anode connected to one terminal of the secondary winding of said transformer, a load circuit connected between the cathodes of said tubes and a nodal point on said secondary winding, and means for preventing alternating current components at harmonic frequencies from flowing in said load circuit comprising a capacity in series with said load circuit, an inductance in parallel with said capacity to tune it to series resonance at the frequency of the harmonic to be suppressed, and a capacity and inductance connected in series between the terminals of each of said rectifier tubes.

2. Means for producing unidirectional current from a source of alternating current comprising, a transformer having its primary winding connected to said source, a plurality of rectifier tubes having an anode connected to one terminal of the secondary winding of said transformer, a load circuit connected between the cathodes of said tubes and a nodal point on said secondary winding, and means for preventing alternating current components at harmonic frequencies from flowing in said load circuit comprising a capacity in series with said load circuit, a variable inductance in parallel with said capacity to tune it to series resonance at the frequency of the harmonic to be suppressed, and a capacity and inductance connected in series between the anode and cathode of each rectifier tube.

3. Means for producing unidirectional current from a six phase source of alternating current comprising, a transformer having its primary winding connected to said source, three electron rectifier tubes each having an anode connected to a pair of terminals of the secondary winding of said transformer, a load circuit connected between the cathodes of said tubes and a nodal point on said secondary winding, and means for preventing alternating current components at harmonic frequencies from flowing in said load circuit comprising a capacity in series with said load circuit, an inductance in parallel with said capacity to tune it to series resonance at the frequency of the harmonic to be suppressed, and a capacity and inductance connected in series between the terminals of each of said rectifier tubes.

4. Means for producing unidirectional current from a source of alternating current comprising, a transformer having its primary winding connected to said source, a plurality of electron rectifier tubes each having an anode connected to one terminal of the secondary winding of said transformer, a load circuit connected between the cathodes of said tubes and a nodal point on said secondary winding, and means for preventing alternating current components at harmonic frequencies from flowing in said load circuit comprising a capacity in series with said load circuit, an inductance in parallel with said capacity, and a reactance connected between the terminals of each of said rectifiers to tune it to series resonance at the frequency of the harmonic to be suppressed.

MENDEL OSNOS.